(12) United States Patent
Barraza Enciso et al.

(10) Patent No.: US 11,575,510 B2
(45) Date of Patent: *Feb. 7, 2023

(54) QUANTUM KEY SYNCHRONIZATION WITHIN A SERVER-CLUSTER

(71) Applicant: Bank of America Corporation, Charlotte, NC (US)

(72) Inventors: Maria Carolina Barraza Enciso, New York, NY (US); Elena Kvochko, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/535,624

(22) Filed: Nov. 25, 2021

(65) Prior Publication Data

US 2022/0085986 A1 Mar. 17, 2022

Related U.S. Application Data

(63) Continuation of application No. 16/670,875, filed on Oct. 31, 2019, now Pat. No. 11,251,946.

(51) Int. Cl.
*H04L 9/08* (2006.01)
*H04L 9/16* (2006.01)
*H04L 9/12* (2006.01)
*G06N 10/00* (2022.01)

(52) U.S. Cl.
CPC .......... *H04L 9/0855* (2013.01); *G06N 10/00* (2019.01); *H04L 9/0869* (2013.01); *H04L 9/12* (2013.01)

(58) Field of Classification Search
CPC ....... H04L 9/0855; H04L 9/12; H04L 9/0869; H04L 9/16; G06N 10/00
See application file for complete search history.

(56) References Cited

U.S. PATENT DOCUMENTS

| 7,178,277 B2 | 2/2007 | Takeuchi |
| 7,519,641 B2 | 4/2009 | Ribordy et al. |
| 7,577,257 B2 | 8/2009 | Xia et al. |
| 7,590,868 B2 | 9/2009 | Musa et al. |

(Continued)

OTHER PUBLICATIONS

Clock synchronization using maximal multipartite entanglement, by Ren et al., published 2012 (Year: 2012).*

(Continued)

*Primary Examiner* — Vu V Tran
(74) *Attorney, Agent, or Firm* — Weiss & Arons LLP (57) ABSTRACT

A system for quantum key synchronization within a server-cluster is provided. The system may include a plurality of silicon-based servers encapsulated in quantum cases. Each quantum case may include a quantum tunneling transmitter module, a quantum random number generator and a quantum entanglement module. The quantum cases may communicate with each other via the quantum tunneling transmitter module or any other suitable manner. The quantum cases may only communicate with cases with which they are entangled. Therefore, in the event of a compromise on one of the servers, the quantum entanglement module, included in the case that encapsulates the compromised server, may become disentangled, and therefore not be able to communicate with the other servers included in the cluster using an internal communications protocol.

20 Claims, 5 Drawing Sheets

(56) References Cited

U.S. PATENT DOCUMENTS

| | | | |
|---|---|---|---|
| 7,697,693 B1 | 4/2010 | Elliott | |
| 7,706,535 B1 | 4/2010 | Pearson et al. | |
| 7,929,700 B2 | 4/2011 | Lodewyck et al. | |
| 8,170,211 B2* | 5/2012 | Langer | H04L 9/0858 380/278 |
| 8,340,298 B2 | 12/2012 | Gelfond et al. | |
| 8,483,394 B2 | 7/2013 | Nordholt et al. | |
| 8,582,769 B2 | 11/2013 | Zhao et al. | |
| 8,639,932 B2 | 1/2014 | Wiseman et al. | |
| 8,650,401 B2 | 2/2014 | Wiseman et al. | |
| 8,693,691 B2 | 4/2014 | Jacobs | |
| 8,744,075 B2 | 6/2014 | Tanaka | |
| 8,897,449 B1 | 11/2014 | Broadbent | |
| 8,903,094 B2 | 12/2014 | Bovino | |
| 9,663,358 B1 | 5/2017 | Cory et al. | |
| 9,698,979 B2* | 7/2017 | Armstrong | H04L 9/0819 |
| 10,127,499 B1 | 11/2018 | Rigetti et al. | |
| 10,296,047 B2 | 5/2019 | Kallman et al. | |
| 10,348,493 B2 | 7/2019 | Fu et al. | |
| 10,644,882 B2 | 5/2020 | Kurian | |
| 10,708,046 B1 | 7/2020 | Ashrafi | |
| 10,802,800 B1 | 10/2020 | Vakili | |
| 11,120,357 B2 | 9/2021 | Zeng et al. | |
| 2010/0223385 A1 | 9/2010 | Gulley et al. | |
| 2011/0182428 A1 | 7/2011 | Zhao et al. | |
| 2011/0317836 A1* | 12/2011 | Yeh | H04L 9/0855 380/255 |
| 2013/0315395 A1 | 11/2013 | Jacobs | |
| 2014/0068765 A1 | 3/2014 | Choi et al. | |
| 2014/0355998 A1 | 12/2014 | Tanzilli et al. | |
| 2015/0199178 A1 | 7/2015 | Shi et al. | |
| 2016/0226840 A1 | 8/2016 | Buccella et al. | |
| 2017/0038793 A1 | 2/2017 | Kallman et al. | |
| 2017/0063827 A1 | 3/2017 | Ricardo | |
| 2018/0089733 A1 | 3/2018 | Huang et al. | |
| 2018/0240032 A1 | 8/2018 | van Rooyen | |
| 2018/0309785 A1 | 10/2018 | Kurian | |
| 2018/0365585 A1 | 12/2018 | Smith et al. | |
| 2018/0375650 A1* | 12/2018 | Legre | G06F 1/12 |
| 2019/0026234 A1 | 1/2019 | Harnik et al. | |
| 2019/0097792 A1 | 3/2019 | Howe et al. | |
| 2019/0322298 A1 | 10/2019 | Mong et al. | |
| 2020/0043007 A1 | 2/2020 | Simons | |
| 2020/0274697 A1 | 8/2020 | Ragan | |
| 2020/0304292 A1 | 9/2020 | Mochalov | |
| 2020/0351089 A1 | 11/2020 | Wentz | |
| 2020/0387395 A1 | 12/2020 | Viale et al. | |
| 2021/0044433 A1 | 2/2021 | Hay et al. | |
| 2021/0081935 A1 | 3/2021 | Faulkner et al. | |
| 2021/0083863 A1* | 3/2021 | Bush | H04L 9/0852 |
| 2021/0314143 A1 | 10/2021 | Conner | |

OTHER PUBLICATIONS

Quantum synchronization over quantum networks, by Lohe, published 2010 (Year: 2010).*

"An Introduction to High Availability Architecture," https://www.getfilecloud.com/blog/an-introduction-to-high-availability-architecture/, CodeLathe Technologies Inc., Retrieved on Sep. 26, 2019.

Quintessence et al; Quantum Tunneling Away From Cyber Criminals; Feb. 2018; Quintessence Labs. (Year: 2018).

Jason M. Rubin, "Can a Computer Generate a Truly Random Number?" https://engineering.mit.edu/engage/ask-an-engineer/can-a-computer-generate-a-truly-random-number/, Nov. 1, 2011.

John Kelsey et al., "Cryptanalytic Attacks on Pseudorandom Number Generators," https://www.schneier.com/academic/paperfiles/paper-prngs.pdf, University of California Berkeley, 1998.

Tom Foremski, IBM Warns of Instant Breaking of Encryption by Quantum Computers: 'Move Your Data Today', https://www.zdnet.com/article/ibm-warns-of-instant-breaking-of-encryption-by-quantum-computers-move-your-data-today/, CBS Interactive, May 18, 2018.

John Cox, "New iOS App Secures IM Traffic with 'Post Quantum' Encryption Scheme: PQChat Intended as Secure Alternative to WhatsApp," https://www.networkworld.com/article/2177124/new-ios-app-secures-im-traffic-with-post-quantum--encryption-scheme.html, Network World, May 23, 2014.

Jack Purcher, "Apple Patent Reveals Breakthrough Quantum Tunneling Touch-Sensitive Materials for iPhone, Smart Cases & More," https://www.patentlyapple.com/patently-apple/2017/02/apple-patent-reveals-breakthrough-quantum-tunneling-touch-sensitive-materials-for-iphone-smart-cases-more.html, Feb. 9, 2017.

Robert Samuel Hanson, "Quantum Computers will Break the Encryption that Protects the Internet," https://www.economist.com/science-and-technology/2018/10/20/quantum-computers-will-break-the-encryption-that-protects-the-internet, The Economist, Oct. 20, 2018.

Cathal O'Connell, "Quantum Computing for the Qubit Curious," https://cosmosmagazine.com/physics/quantum-computing-for-the-qubit-curious, Cosmos, Aug. 8, 2016.

"Quantum Computing," https://en.wikipedia.org/wiki/Quantum_computing, Wikimedia Foundation, Inc., Jul. 14, 2019.

Lily Chen et al., "Report on Post-Quantum Cryptography," https://nvlpubs.nist.gov/nistpubs/ir/2016/NIST.IR.8105.pdf, National Institute of Standards and Technology, Apr. 2016.

"Security Token," https://en wikipedia.org/wiki/Security_token, Wikimedia Foundation, Inc., Jun. 21, 2019.

Gorjan Alagic et al., "Status Report on the First Round of the NIST Post-Quantum Cryptography Standardization Process," https://www.nist.gov/publications/status-report-first-round-nist-post-quantum-cryptography-standardization-process, National Institute of Standards and Technology, Jan. 2019,.

Christian S. Calude and Elena Calude, "The Road to Computational Supremacy," https://arxiv.org/pdf/1712.01356.pdf, Jan. 10, 2019.

Patrick Nohe, "What is an Air Gapped Computer?" https://www.thesslstore.com/blog/air-gapped-computer/, HashedOut, Mar. 13, 2018.

Emily Grumbling and Mark Horowitz, "Quantum Computing: Progress and Prospects," https://www.nap.edu/read/25196/chapter/1, National Academy of Sciences, 2018.

* cited by examiner

FIG. 1

QUANTUM ENTANGLEMENT

Quantum Superposition —202

Quantum Entanglement —208

QUANTUM KEY SYNCHRONIZATION WITHIN A SERVER-CLUSTER

CROSS-REFERENCE TO RELATED APPLICATION

This application is a continuation of U.S. patent application Ser. No. 16/670,875 filed on Oct. 31, 2019, now U.S. Pat. No. 11,251,946, and entitled "QUANTUM KEY SYNCHRONIZATION WITHIN A SERVER-CLUSTER" which is hereby incorporated by reference herein in its entirety.

FIELD OF TECHNOLOGY

Aspects of the disclosure relate to cryptographic keys. Specifically, this disclosure relates to cryptographic keys used with quantum-resilient computing systems.

BACKGROUND

Many transactions are processed using one or more digital devices. Such transactions may be known as digital transactions. Every digital transaction generates data. The generated data is processed, transformed and stored. There is value associated with each generated data element. The value may be a personal value. The value may be a historical value. The value may be any suitable value.

While data analytics and big data have revolutionized the modern world, the concentration of data has also enabled an era of digitally-based criminal activity. Therefore, entities may be required to consider criminal activity in addition to various other factors when planning the architecture of their systems that process, transform and store data. As such, entities may consider various concerns associated with data processing. These concerns may include complexity, cost, availability, redundancy, integrity and confidentiality. These concerns may be prioritized based on level of risk.

The architecture of a low-risk system may prioritize complexity, cost or integrity, and therefore, have a centralized system. In such a system, data may be stored and processed in a single computer or single computer system.

The architecture of a high-risk system may be a distributed system that includes redundant data. In such a high-risk system, availability and confidentiality may be a system priority, and complexity may not be a system priority. As such, any system that is not centralized on a single node, may add a level of complexity and may require some level of synchrony to operate. Synchrony may be a rate and sequence by which the two nodes communicate data between each other. The lowest level of synchrony may be that both systems start from the same place and never communicate again with each other. The highest level of synchrony may be that both systems communicate with each other in real-time.

One of the main benefits of a distributed and decentralized system is the ability to access a copy of data that is included on a node that experienced a failure. Therefore, a distributed and decentralized system may be more secure than a centralized system by design.

Additionally, recently, quantum computing has become more viable. Quantum computing is the use of quantum-mechanical phenomena such as superposition, spin and entanglement to perform computations. The smallest bit in a quantum computer is called a qubit. Quantum computing differs from classical computing in such a way that each qubit can be in a zero state and a one state at the same time.

Quantum entanglement may be a property in which quantum particles become entangled. Once entangled, the particles remain connected so that actions performed on one affect the other, even when separated by great distances. A quantum particle may have certain characteristics. One of the characteristics may be a spin. The spin may be determined to be spin-up or spin-down. The rules of quantum physics state that an unobserved quantum particle, such as a photon, exist in all possible states simultaneously, but, when observed or measured, collapses into one state. When the spin of one entangled particle is measured, the paired particle is observed to have the exact opposite spin. Therefore, if one particle is observed in a spin-up state, its entangled particle is observed in a spin-down state. This phenomenon occurs even when the particles are separated by large distances.

It would be desirable to utilize quantum entanglement properties to maintain the security of a distributed architecture system.

SUMMARY OF THE DISCLOSURE

A method for synchronizing quantum keys within a server-cluster is provided. The server-cluster may include a plurality of silicon-based servers.

The method may include encapsulating each of a plurality of silicon-based servers in a quantum case. The method may include leveraging quantum entanglement properties to entangle each quantum case with other quantum cases included in the server-cluster. The method may include generating a quantum-resilient random number at a first quantum case. The first quantum case may encapsulate a first silicon-based server included in the server-cluster.

The method may include transmitting the generated quantum-resilient random number from the first quantum case to the other quantum cases. The method may include replacing a module for dynamic encryption, within each of the other quantum cases, with the quantum-resilient random number. The module for dynamic encryption may include a placeholder for an encryption key. The placeholder may be a portion of memory that can store an encryption key. The encryption key may be changed or replaced each time a quantum-resilient random number is received.

The method may include encrypting one or more messages using the quantum-resilient random number at one or more of the quantum cases. The method may include transmitting the one or more encrypted messages from the one or more quantum cases to a location external to the server-cluster.

The method may include, in response to a passage of a predetermined time period after the transmitting of the generated quantum-resilient random number, generating a second quantum-resilient random number at a second quantum case. The second quantum case may encapsulate a second silicon-based server included in the server-cluster. The method may include transmitting the second quantum-resilient random number from the second quantum case to the other quantum cases that encapsulate the other silicon-based servers included in the server-cluster. The method may also include replacing the module for dynamic encryption within the quantum cases that encapsulate the other silicon-based servers with the second quantum-resilient random number.

The method may include, upon corruption of a second silicon-based server included in the server-cluster, disentangling a second quantum case that encapsulates the second silicon-based server from the other quantum cases included in the server-cluster. The method may also include preventing the second silicon-based server from receiving quantum-resilient random numbers.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus and methods for quantum key synchronization within a server-cluster are provided. The system may include a plurality of silicon-based servers. Each of the silicon-based servers may be encapsulated in a quantum case. Each quantum case may include a quantum tunneling transmitter module.

Each quantum case may also include a quantum random number generator. The quantum random number generator may be operable to generate quantum-resilient random numbers. The quantum-resilient random numbers may be for use in quantum-resilient cryptographic schemes.

Each quantum case may also include a quantum entanglement module. The quantum entanglement module, included in each quantum case, may be entangled with other quantum entanglement modules, included in other quantum cases. In some embodiments, each quantum entanglement module may be entangled with every other quantum case within the server-cluster. In certain embodiments, each quantum entanglement module may be entangled with a centralized silicon-based server within the server-cluster.

In some embodiments, a first quantum case may communicate with a second quantum case. In some embodiments in which disentanglement is a sign of compromise, the communication may determine whether the second quantum case is in a state of entanglement with the first quantum case. The communication may identify the security of the second quantum case. In the event that the second quantum case is determined to be in a state of entanglement with the first quantum case, the first quantum case may ascertain that the second quantum case is secure. In the event that the second quantum case is determined to be detangled from the first quantum case, the first quantum case may ascertain that the security of the second quantum case has been compromised.

There may also be an additional security module for advancing security of quantum cases that are entangled with one another. A security module, within a first quantum case, may identify, using communications such as those described above, a second quantum case that has been compromised. The security module, within the first quantum case, may verify that the second quantum case has been compromised. In response to such a verification, the first quantum case may disentangle from the second quantum case and/or disable communications between the first quantum case and the second quantum case.

The quantum random number generator, included in each quantum case, may be operable to generate quantum-resilient random numbers. The quantum-resilient random numbers may be used as encryption keys.

There may be different modes to determine which case generates the encryption key to be adopted by all of the other cases. Different exemplary modes are described below.

In one mode, the quantum case that generated the quantum-resilient random number may transmit the generated quantum-resilient random number to the other quantum cases that encapsulate the plurality of silicon-based servers. The quantum cases that encapsulate the plurality of silicon-based servers may be operable to replace a module for dynamic encryption with the quantum-resilient random number. The quantum cases that encapsulate the plurality of silicon-based servers may utilize the quantum-resilient random number to encrypt messages transmitted to a location external to the server-cluster. The transmission may be via the quantum tunneling transmitter module included in each case.

In another exemplary mode, preferably in response to a passage of a predetermined time period from a first quantum case transmission of the quantum-resilient random number, a quantum random number generator, included in a second quantum case, may generate a second quantum-resilient random number. The second quantum case may transmit the generated quantum-resilient random number to the quantum cases that encapsulate the plurality of silicon-based servers. The quantum cases that encapsulate the plurality of silicon-based servers may adopt the second quantum-resilient random number as an encryption key. The quantum cases that encapsulate the plurality of silicon-based servers may replace the module for dynamic encryption with the second quantum-resilient number.

When a second silicon-based server included in the server-cluster is corrupted, the quantum entanglement module included in the quantum case of the second silicon-based server is disentangled from at least one quantum entanglement module within the server cluster. In response to the disentanglement, the second silicon-based server is prevented from receiving quantum-resilient random numbers from other servers in the server-cluster. Such a mode may protect the remaining servers in the server-cluster from becoming corrupted or compromised as a result of a corruption or compromise on one of the servers.

In some embodiments, a centralized silicon-based server included in the server-cluster is entangled with all cases within the server-cluster. In such an embodiment, the centralized silicon-based cluster may be notified when a server becomes corrupted or compromised. In this embodiment, each server included in the server-cluster may not be entangled with all of the other servers included in the server-cluster. The single centralized server-cluster may maintain a record of the servers and their states—i.e., entangled or disentangled. In such an embodiment, the centralized server may also transmit the quantum-resilient random number to the servers within the server-cluster.

In some embodiments, each silicon-based server may be entangled with at least one other silicon-based server within the server-cluster. In such an embodiment, each silicon-based server may communicate with a predetermined silicon-based server, and thereby, each server is notified on the updated quantum-resilient random number.

It should be appreciated that quantum tunneling may be the method of transmission used to transmit data between cases. Quantum tunneling may also be the method of transmission used to transmit data between a server within the server-cluster and a server external to the server-cluster. The data being transmitted may be an encrypted message or a quantum-resilient random number. The quantum tunneling transmitter module within each case may transmit the data.

In some embodiments, the quantum cases that encapsulate the plurality of silicon-based servers generate a combination of a silicon-based server identifier with the quantum-resilient random number. The quantum cases may adopt the combination of the silicon-based server identification and the quantum-resilient random number as an encryption key. Each of the silicon-based servers may replace the module for dynamic encryption with the combination of the silicon-based server identifier and the quantum-resilient random number. The silicon-based server identifier of each silicon-based server may be available for retrieval from the other silicon-based servers via the quantum entanglement module.

The combination of the silicon-based identifier and the quantum-resilient random number may be used to encrypt messages being transmitted from the server. The messages may be internal to the server-cluster. The messages may be external to the server-cluster. The servers within the server-cluster may be able to decrypt the messages because each server may determine the encryption key. The encryption key may be determined as follows: the receiving server may determine the identifier of the transmitting server based on transmitting server included in the message and the receiving server may combine the server identifier with the quantum-resilient random number that is shared between all of the servers on the server-cluster. Thereafter, the receiving server may determine the encryption key. The receiving server may use the encryption key to decrypt the message.

In some embodiments, other combinations may be used. Such combinations may include a hash of the silicon-based server identifier with the quantum-resilient random number.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
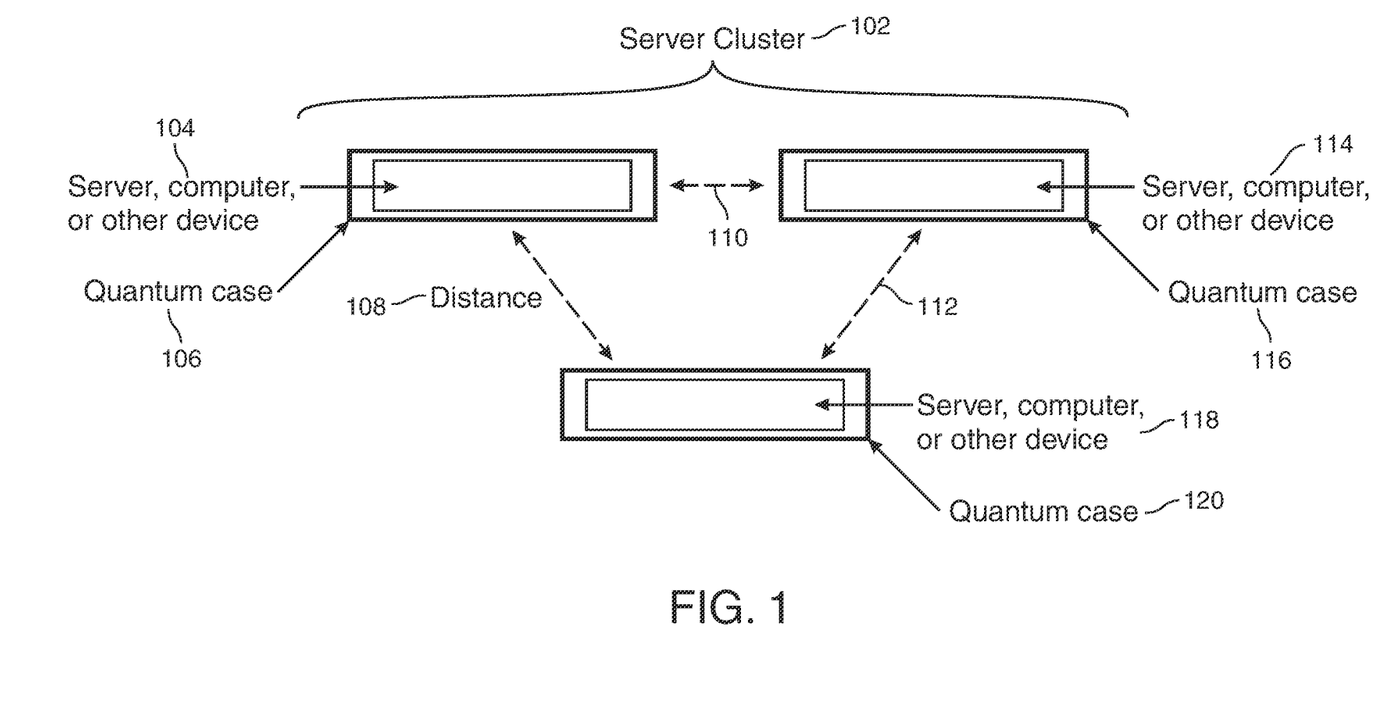
FIG. 1 shows an illustrative table in accordance with principles of the disclosure.

FIG. 1 shows an illustrative diagram. Server-cluster 102 may include server, computer or other device 104. Server-cluster 102 may also include server, computer or other device 114. Server-cluster 102 may also include server, computer or other device 118. Device 104 may be encapsulated within quantum case 106. Device 114 may be encapsulated within quantum case 116. Device 118 may be encapsulated within quantum case 120.

Quantum cases 106, 116 and 120 may each include a quantum random number generator, a quantum tunneling transmitter module and a quantum entanglement module. The quantum random number generator may generate random numbers that are quantum resilient—i.e., cannot be easily determined using quantum computers. The quantum tunneling transmitter module may transmit messages between devices within the cluster and external to the cluster. The quantum tunneling transmitter module may utilize quantum tunneling properties to execute the transmission. The quantum entanglement module may include one or more entangled particles. Each of the entangled particles may be entangled with another quantum entanglement module included in another case.

It should be appreciated that there may be distance between devices 104, 114 and 118. The distance may be shown at 108, 110 and 112. The distance may be a relatively large distance. The distance may be a relatively small distance. However, devices 104, 114 and 118 may continue to operate as a server-cluster because the quantum entanglement modules within cases 106, 116 and 120 remain entangled, and therefore, the devices remain in communication. If, the quantum entanglement modules become disentangled, the devices may no longer be in communication. Disentanglement between entanglement modules may indicate that a device has become corrupted.

Figure 2:
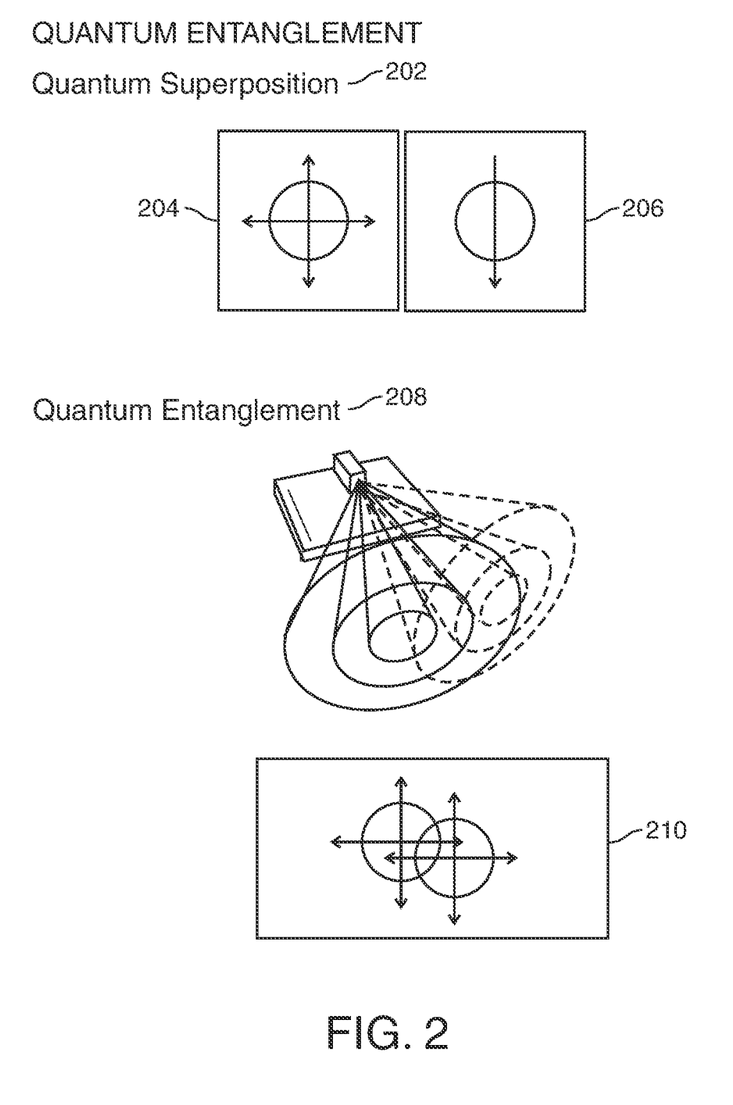
FIG. 2 shows an illustrative diagram in accordance with principles of the disclosure.

FIG. 2 shows an illustrative diagram. The illustrative diagram may include quantum superposition, as shown at 202. The rules of quantum physics state that an unobserved quantum particle, such as a photon, exist in all possible states simultaneously, as shown at 204. However, when observed or measured, the quantum particle collapses into one state, as shown at 206 (spin-down).

Quantum entanglement, shown at 208, may occur when two quantum particles become connected. A laser beam fired through a certain type of crystal can cause individual photons to be split into pairs of entangled photons. A pair of entangled particles may be shown at 210.

Figure 3:
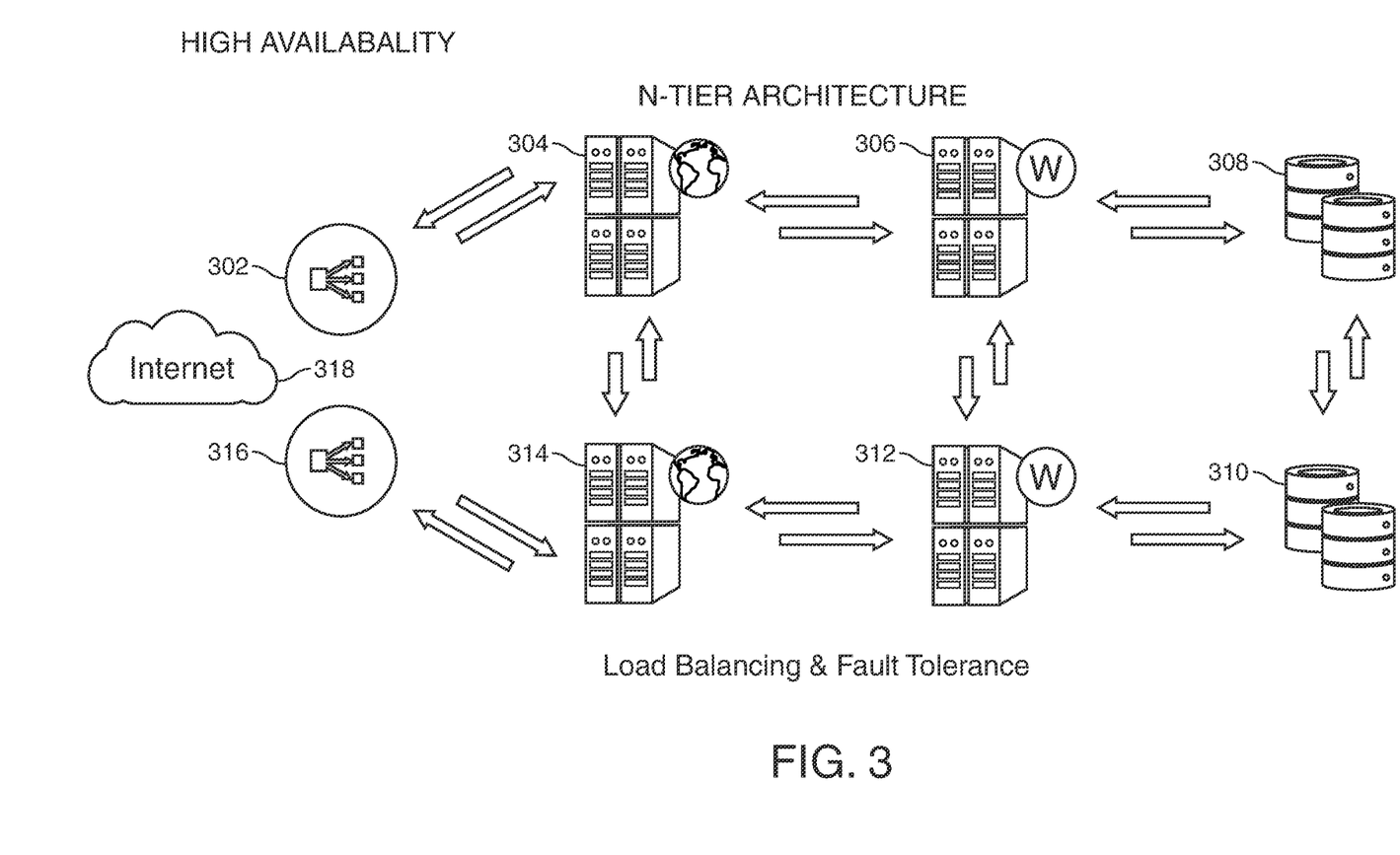
FIG. 3 shows another illustrative diagram in accordance with principles of the invention.

FIG. 3 shows a high-availability architecture. High-availability architecture is an approach of defining the components, modules or implementation of services of a system which ensures optimal operational performance, even at times of high loads. Devices and/or servers 302, 304, 306, 308, 310, 312, 314 and 316 may communicate with each other in order to provide the high-availability architecture. Each of devices and/or servers 302, 304, 306, 308, 310, 312, 314 and 316 may be in communication with one or more of the other devices and/or servers. Communication with multiple devices may provide greater load balancing and fault tolerant capabilities.

Figure 4:
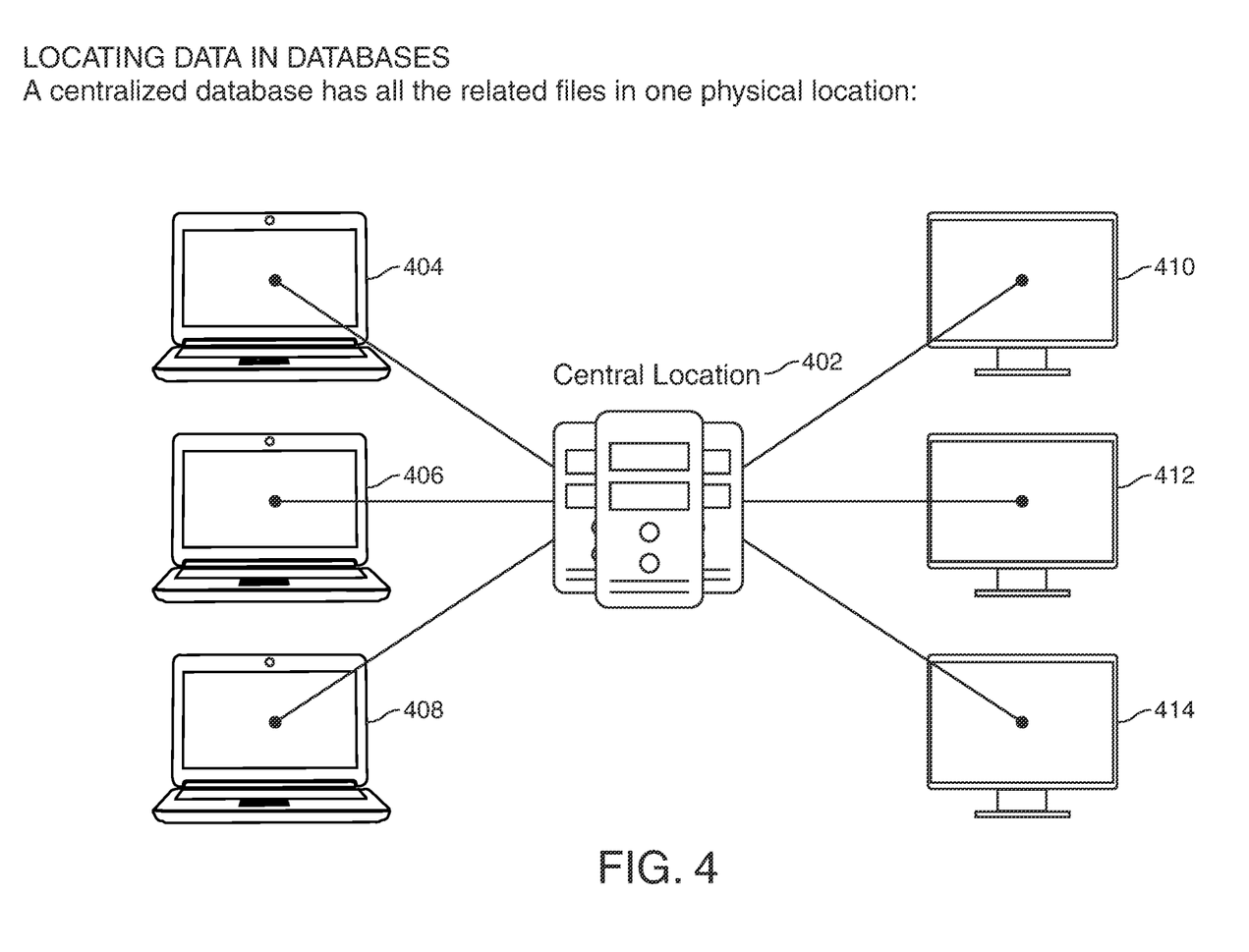
FIG. 4 shows yet another illustrative diagram in accordance with principles of the invention.

FIG. 4 shows a centralized database architecture. The centralized database architecture may include a central location, shown at 402. Central location 402 may include substantially all of the data files associated with the system. Devices 404, 406, 408, 410, 412 and 414 may access central location 402 in order to retrieve, read, write, update or store data files.

In one embodiment, devices 404-414 may be encased in quantum cases. In such an embodiment, each of the device cases may communicate with central location 402, or with a quantum case that encases central location 402. Central location 402 may communicate a quantum-resilient cryptographic key and/or quantum-resilient cryptographic key updates to each of the device cases in communication with central location 402.

Figure 5:
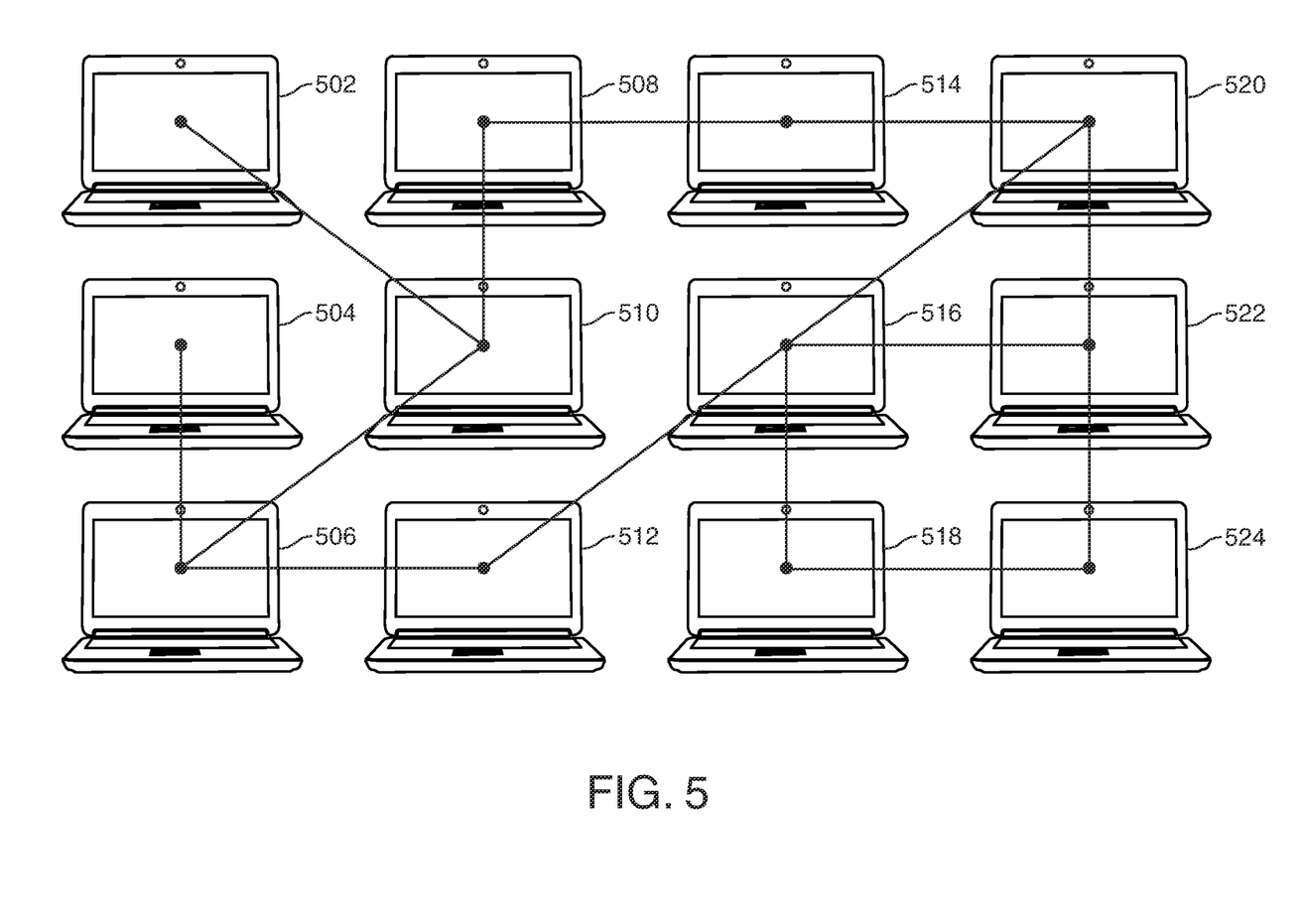
FIG. 5 shows still another illustrative diagram in accordance with principles of the invention.

FIG. 5 shows a distributed database architecture. The distributed database architecture may include multiple devices, shown at 502-524. Each of devices 502-524 may include a portion of data files may be in communication with one or more of the other devices.

It should be appreciated that each data file may be included on multiple devices. Therefore, in the event of a failure of one or more devices, access to the data files included on a failed device may remain available.

In some embodiments, each of devices 502-524 may be encapsulated in a quantum case. Each of the quantum cases may communicate with one or more other quantum cases. In such an embodiment, the quantum cases may communicate quantum-resilient cryptographic keys to other quantum cases with the distributed database. It should be appreciated that, in some embodiments, the quantum-resilient cryptographic keys may only be transmitted to other quantum cases that are entangled with at least one other quantum case within the distributed database.

Thus, systems and methods for quantum key synchronization within a server-cluster have been provided. Persons skilled in the art will appreciate that the present invention can be practiced by other than the described embodiments, which are presented for purposes of illustration rather than of limitation.

What is claimed is:

1. A system for quantum key synchronization within a server-cluster, the system comprising:
   a plurality of silicon-based servers encapsulated in quantum cases, each quantum case comprising:
     a quantum tunneling transmitter module;
     a quantum random number generator, the quantum random number generator generates quantum-resilient random numbers for use in quantum-resilient cryptographic schemes; and
     a quantum entanglement module;
   wherein:
     the quantum entanglement module, included in each quantum case, is entangled with the other quantum entanglement modules, included in the other quantum cases included in the server-cluster; and
     the quantum random number generator, included in a first quantum case of a first silicon-based server included in the server-cluster, generates a quantum-resilient random number; and
     the first quantum case transmits the generated quantum-resilient random number to the quantum cases that encapsulate the plurality of silicon-based servers;
     the quantum cases that encapsulate the plurality of silicon-based servers adopt the quantum-resilient random number as an encryption key;
     the quantum cases that encapsulate the plurality of silicon-based servers replace a module for dynamic encryption, included in each quantum case, with the quantum-resilient random number;
     the quantum cases that encapsulate the plurality of silicon-based servers utilize the quantum-resilient random number to encrypt messages transmitted, to a location external to the server-cluster, via the quantum tunneling transmitter module included in each quantum case; and
   in response to a passage of a predetermined time period from the first quantum case transmission of the quantum-resilient random number:
     the quantum random number generator, included in a second quantum case of a second silicon-based server included in the server-cluster, generates a second quantum-resilient random number;
     the second quantum case transmits the second quantum-resilient random number to the quantum cases that encapsulate the plurality of silicon-based servers;
     the quantum cases that encapsulate the plurality of silicon-based servers adopts the second quantum-resilient random number as an encryption key; and
     the quantum cases that encapsulate the plurality of silicon-based servers replace the module for dynamic encryption with the second quantum-resilient random number.

2. The system of claim 1, wherein, when a third silicon-based server included in the server-cluster is corrupted:
   the quantum entanglement module included in the quantum case of the third silicon-based server is disentangled from at least one quantum entanglement module within the server cluster; and
   in response to the disentanglement, the third silicon-based server is prevented from receiving quantum-resilient random numbers.

3. The system of claim 2, wherein a centralized silicon-based server is entangled with all cases within the server-cluster.

4. The system of claim 2, wherein each silicon-based server is entangled with at least one other silicon-based server within the server-cluster.

5. The system of claim 1, wherein the first quantum case transmits the quantum-resilient random number using a quantum tunneling transmitter module included in the first quantum case.

6. The system of claim 1, wherein the quantum cases that encapsulate the plurality of silicon-based servers:
   generate a combination of a silicon-based server identifier with the quantum-resilient random number;
   adopt the combination of the silicon-based server identifier and the quantum-resilient random number as an encryption key; and
   replace the module for dynamic encryption included each quantum case with the combination of the silicon-based server identifier and the quantum-resilient random number.

7. The system of claim 1, wherein each quantum case, included in the quantum cases that encapsulate the plurality of silicon-based servers, further comprises a security module configured to identify another quantum case, included in the quantum cases that encapsulate the plurality of silicon-based devices, that is compromised.

8. The system of claim 1, wherein the quantum cases that encapsulate the plurality of silicon-based servers:

generate a hash of a silicon-based server identifier with the quantum-resilient random number;
adopt the hash as an encryption key; and
replace the module for dynamic encryption with the hash of the silicon-based server identifier and the quantum-resilient random number.

9. The system of claim 8, wherein the silicon-based server identifier, of each silicon-based server, is available for retrieval from the other silicon-based servers included in the plurality of silicon-based servers, via the quantum entanglement module.

10. A method for synchronizing quantum keys within a server-cluster, the method comprising:
encapsulating, within the server-cluster, each of a plurality of silicon-based servers in a quantum case, each of said quantum cases belonging to a plurality of quantum cases;
leveraging quantum entanglement properties to entangle each quantum case, included in the plurality of quantum cases, with at least one other quantum case, included in the plurality of quantum cases;
generating a quantum-resilient random number at a first quantum case, included in the plurality of quantum cases, said first quantum case that encapsulates a first silicon-based server included in the server-cluster;
transmitting the generated quantum-resilient random number from the first quantum case to the plurality of quantum cases that encapsulate the other silicon-based servers included in the server-cluster;
replacing a dynamic encryption key placeholder with the quantum-resilient random number at the plurality of quantum cases that encapsulate the silicon-based servers included in the server-cluster;
encrypting one or more messages using the quantum-resilient random number at one or more quantum cases included in the plurality of quantum cases;
transmitting the one or more encrypted messages from the one or more quantum cases included in the plurality of quantum cases to a location external to the server-cluster;
generating, in response to a passage of a predetermined time period after the transmitting the generated quantum-resilient random number, a second quantum-resilient random number at a second quantum case, included in the plurality of quantum cases, said second quantum case that encapsulates a second silicon-based server included in the server-cluster;
transmitting the second quantum-resilient random number from the second quantum case to the plurality of quantum cases that encapsulate the other silicon-based servers included in the server-cluster; and
replacing the dynamic encryption key placeholder at the plurality of quantum cases that encapsulate the other silicon-based servers with the second quantum-resilient random number.

11. The method of claim 10, wherein the method further comprises, upon corruption of a third silicon-based server included in the server-cluster:
disentangling the third quantum case, included in the plurality of quantum cases, said third quantum case that encapsulates the third silicon-based server, from the other quantum cases included in the server-cluster; and
preventing the third silicon-based server from receiving quantum-resilient random numbers.

12. The method of claim 11, wherein a centralized silicon-based server is entangled with the plurality of quantum cases.

13. The method of claim 11, wherein each quantum case, included in the plurality of quantum cases, is entangled with at least two other quantum cases included in the plurality of quantum cases.

14. The method of claim 10, wherein the transmitting the generated quantum-resilient random number from the first quantum case to the plurality of quantum cases uses quantum tunneling transmission properties.

15. The method of claim 10, wherein the method further comprises:
generating, at each of the plurality of quantum cases, a combination of a silicon-based server identifier and the quantum-resilient random number; and
replacing the dynamic encryption key placeholder in each of the plurality of quantum cases with the combination of the silicon-based server identifier and the quantum-resilient random number.

16. The method of claim 15, wherein, upon receipt, at the first quantum case, of a message from the second quantum case within the plurality of quantum cases, the first quantum case included in the plurality of quantum cases, identifies the sender based on the encryption key.

17. The method of claim 10, wherein the method further comprises:
generating, at each of the plurality of quantum cases, a hash of a silicon-based server identifier and the quantum-resilient random number; and
replacing the dynamic encryption key placeholder in each of the plurality of quantum cases with the hash of the silicon-based server identifier and the quantum-resilient random number.

18. The method of claim 17, wherein, each silicon-based server that is entangled within the server-cluster:
receives the silicon-based identifier of each other silicon-based server within the cluster;
uses the received identifier data and the quantum resilient random number to determine the encryption key used to encrypt a transmitted message; and
decrypts the transmitted message using the determined encryption key.

19. A system for quantum key synchronization within a server-cluster, the system comprising:
a plurality of silicon-based servers encapsulated in quantum cases, each quantum case comprising:
a quantum tunneling transmitter module;
a quantum random number generator, the quantum random number generator generates quantum-resilient random numbers for use in quantum-resilient cryptographic schemes; and
a quantum entanglement module;
wherein:
the quantum entanglement module, included in each quantum case, is entangled with the other quantum entanglement modules, included in the other quantum cases included in the server-cluster;
the quantum random number generator, included in a first quantum case of a first silicon-based server included in the server-cluster, generates a quantum-resilient random number;
the first quantum case transmits the generated quantum-resilient random number to the quantum cases that encapsulate the plurality of silicon-based servers;
the quantum cases that encapsulate the plurality of silicon-based servers adopt the quantum-resilient random number as an encryption key;
the quantum cases that encapsulate the plurality of silicon-based servers replace a module for dynamic encryption, included in each quantum case, with the quantum-resilient random number;

the quantum cases that encapsulate the plurality of silicon-based servers utilize the quantum-resilient random number to encrypt messages transmitted, to a location external to the server-cluster, via the quantum tunneling transmitter module included in each quantum case; and when a second silicon-based server included in the server-cluster is corrupted, the quantum entanglement module included in the quantum case of the second silicon-based server is disentangled from at least one quantum entanglement module within the server cluster; and in response to the disentanglement, the second silicon-based server is prevented from receiving quantum-resilient random numbers.

20. The system of claim 19, wherein a centralized silicon-based server is entangled with all cases within the server-cluster.

* * * * *